2,999,076
ORGANOPOLYSILOXANE ELASTOMERS CONTAINING SILICA AND A CARBOXYLIC ACID SALT OF COBALT, CERIUM OR COPPER
Thomas D. Talcott, Midland, Mich., assignor to Dow Corning Corporation, Midland, Mich., a corporation of Michigan
No Drawing. Filed Aug. 28, 1956, Ser. No. 606,550
11 Claims. (Cl. 260—18)

The present invention relates to novel oganosiloxane elastomers which are both heat stable and translucent.

Organosiloxane elastomers, popularly known as silicone rubbers, are widely described in the literature and are firmly established in their industrial applications. These rubbers have a well deserved reputation for their excellent heat stability as compared to all other organic rubbers, both natural and synthetic. It has hitherto been found difficult, however, to produce a translucent silicone rubber which retains the heat stability characteristics available in the ordinary opaque silicone rubbers. It has also been difficult to produce variously colored silicone rubbers, which are often desirable for the identification of different insulated electrical parts within a single device, without bringing about drastic changes in the thermal stability or in other desirable properties of silicone rubber.

It is an object of this invention to produce novel and translucent silicone rubber having properties comparable to the properties of ordinary opaque silicone rubber. It is a further object to provide novel colored silicone rubber having physical properties comparable to the white, tan, and red silicone rubbers hitherto available.

This invention particularly relates to a heat curable organopolysiloxane rubber stock consisting essentially of (A) an organosiloxane of the average general formula $$R_nSiO_{\frac{4-n}{2}}$$

where R represents an organic radical selected from the group consisting of monovalent hydrocarbon radicals and halogenated monovalent hydrocarbon radicals and $n$ has a value of from 1.9 to 2.1 inclusive, (B) a silica filler, (C) 0.001 to 0.40 part by weight based on 100 parts of (A) of a metal selected from the group consisting of cobalt, cerium, and copper, added as the corresponding metal salt of a carboxylic acid, and (D) an organoperoxide vulcanizing agent.

The organosiloxanes designated as (A) above, are well known materials having the general formula $$R_nSiO_{\frac{4-n}{2}}$$

R can be any monovalent hydrocarbon radical or any halogenated monovalent hydrocarbon radical. Examples of suitable organic radicals represented by R include alkyl radicals such as methyl, ethyl and octadecyl; aryl radicals such as phenyl and anthracyl; alkaryl radicals such as tolyl, xylyl, and methyl naphthyl; aralkyl radicals such as benzyl and phenylethyl; cycloaliphatic radicals such as cyclohexyl and cyclopentyl; alkenyl radicals such as vinyl and allyl; and halogenated monovalent hydrocarbon radicals such as chloromethyl, chlorophenyl, difluorophenyl, bromophenylethyl, trifluorovinyl and α,α,α-trifluoromethylphenyl.

Many of the organosiloxanes (A) have been commercially available for years. Many methods of preparation of such materials are known and are adequately documented in the literature of the art. These siloxanes can be either homopolymeric or copolymeric materials containing 2 or more different types of siloxane units, and the organic radicals attached to any one silicon atom can be the same or the radicals attached to any one silicon atom can be different. Mixtures of polymers can of course also be used if desired. Preferably at least 75 molar percent of the silicon atoms present in the organosiloxane are substituted with alkyl radicals, among which the methyl radicals provide the most outstanding products. Any radicals present other than methyl radicals are most preferably phenyl radicals. When the organosiloxane is a fluid rather than an insoluble gum, it is preferred that it have a viscosity of at least 10,000 cs. at 25° C.

The silica filler (B) employed herein can be any fume silica, silica aerogel, diatomaceous earth or other silica employed as filling agents for silicone rubber. These materials are well known, commercially available products produced by known methods. In general, the so-called reinforcing silica fillers as disclosed in U.S. Patent 2,541,137 issued February 13, 1951, are preferred, but any silica filler is operative in this invention. In general the silica is employed in amounts ranging from 20 to 100 parts by weight per 100 parts of the organosiloxane, although this can vary considerably with the type of silica employed and the hardness, etc. desired in the product.

The improved heat stability of the silicone rubbers of this invention is due to the presence of copper, cerium, and/or cobalt as a salt of a carboxylic acid. Such salts of any carboxylic acid are operative in this invention, and they can be either the cupric, cuprous, ceric, cerous, cobaltic, or cobaltous forms. Examples of suitable salts include the acetates, butyrates, octoates, 2-ethylhexoates, laurates, naphthenates, benzoates, maleates, citrates, and stearates.

The salts are added in amounts which are determined by the metal content of the salt. The amount of cobalt, cerium, or copper added as the salt should be in the range of from 0.001 to 0.40 part by weight of the metal per 100 parts of the organosiloxane (A). Thus it is not the amount of salt added, but the amount of metal added as the salt which is critical. When the metal is present to an extent of less than 0.001 part per 100 parts of the organosiloxane, the heat stability of the rubber is not appreciably improved. The presence of more than 0.40 part of the metal per 100 parts of the organosiloxane results in products which are undesirably more resinous or plastic in nature. The best results are obtained herein by the use of from 0.02 to 0.2 part by weight of the cobalt and/or copper per 100 parts of the organosiloxane.

For best results it is desirable that the chosen metal salt be soluble in the organopolysiloxane in the amounts used. However, if the salt can be evenly dispersed throughout the organosiloxane, it is not necessary that it be soluble. The important factor here is that the salt be dispersed evenly throughout the compounded mixture, and obviously a soluble salt will be more easily dispersed.

The silicone rubber stocks of this invention are preferably vulcanized in the conventional manner by incorporating any of the organic peroxides such as benzoyl peroxide, t-butyl perbenzoate, or dichlorobenzoyl peroxide into said stocks and thereafter heating the mixture. The preferred amounts of peroxides employed range from 0.075 to 10 parts by weight per 100 parts of the organsiloxane, with best results in most systems obtained by using 0.5 to 2 parts per 100. The preferred vulcanization temperature ranges from 100 to 250° C. If desired, however, ionizing radiation can be used as the source of vulcanization in place of the peroxides.

The silicone rubber stock of this invention can be compounded by the use of any appropriate mixing apparatus and the order of addition of ingredients is not critical. A preferred manner of operation is to disperse the salt throughout the organosiloxane compound (A) on a roll mill and thereafter to add the silica filler (B) and the organoperoxide (D) in that order.

The silicone rubbers of this invention are useful for any of the many previously known applications for heat-vulcanized silicone rubbers, e.g., as electrical insulation and heat resistant gaskets. Although iron salts of carboxylic acids also improve the thermal stability of silicone rubbers, I have found that the cobalt, cerium, and copper salts used herein do not have the tendency to cause the "crepe hardening" which has been encountered when iron salts are used in a compounded stock which happens to contain silicon bonded hydroxy groups. "Crepe hardening" is the undesired stiffening of a compounded stock during storage and prior to vulcanization.

The following examples are illustrative only. All parts and percentages in the examples are upon a weight basis.

EXAMPLE 1

A silicone rubber stock was compounded in the following manner. 100 parts of a dimethylsiloxane polymer having a viscosity exceeding 1,000,000 cs. at 25° C. and 0.057 part cobalt added as cobaltous octoate were milled together, followed by the addition of 35 parts of a fume silica filler and 1.5 parts benzoyl peroxide in that order. The entire mixture was thoroughly milled and a sheet of the resulting organosiloxane rubber stock was cured for 24 hours at 249° C. A similar stock, except that the cobaltous octoate was omitted, was compounded and cured using the same techniques and conditions. To test the heat stability of the cured rubbers, samples were heated at 249° C. for 7 days, after which the durometer (Shore hardness), tensile strength (in p.s.i.), and per cent elongation at break of each was determined. Portions of the samples not employed in the tests were then further heated for 48 hours at 315° C. and the tests were repeated. The sample which contained no additive was so brittle and useless as a rubber, however, that no data of any meaning could be obtained after the latter heating period. Another silicone rubber stock was compounded and cured according to the above schedule, except that 0.11 part of copper added as cupric octoate was employed in place of the cobaltous octoate used above. The results obtained in the testing of these 3 samples are given in Table I below. The rubber which contained cobalt was a light purple in color, that which contained copper was light blue.

*Table I*

|  | No Additive | Cobalt Octoate | Copper Octoate |
|---|---|---|---|
| 24 Hrs. 249° C.: |  |  |  |
| Durometer | 50 | 50 | 38 |
| Tensile | 600 | 870 | 230 |
| Percent Elongation | 250 | 380 | 430 |
| 7 Days, 249° C.: |  |  |  |
| Durometer | 75 | 56 | 45 |
| Tensile | 600 | 550 | 480 |
| Percent Elongation | 80 | 220 | 380 |
| 48 Hrs., 315° C.: |  |  |  |
| Durometer | Brittle | 94 | 70 |
| Tensile | do | 680 | 270 |
| Percent Elongation | do |  | 50 |

EXAMPLE 2

Employing the method of Example 1, silicone rubber stocks were made with the siloxane polymer, silica filler, and vulcanizing agent of that example except that 0.1 part of cobalt, cerium, or copper as cobaltous acetate, naphthenate, or laurate; cobaltic acetate; cupric acetate, naphthenate, or oleate; or cerous benzoate, malate, or oxalate were employed in place of the octoates of that example. After vulcanization, the resulting rubbers in each case retained their elasticity and rubberyness at temperatures which caused the control stock, which did not contain any of the metal salts, to show brittleness and loss of rubbery properties.

EXAMPLE 3

When a copolymeric organosiloxane containing 85 mol per cent dimethylsiloxane, 10 mol per cent phenylmethyl-siloxane, 4.8 mol per cent α,α,α-trifluortolylmethylsiloxane, and 0.2 mol percent methylvinylsiloxane units is substituted for the dimethylsiloxane of Example 1 and converted to a rubber by the method of that example, the incorporation of copper or cobalt octoate produces a comparable improvement in the heat stability of the vulcanized rubber.

EXAMPLE 4

A silicone rubber stock was compounded using the amounts and types of polymer, filler and peroxide catalyst employed in Example 1, and 0.046 part of cerium was added as cerous naphthenate. After thorough milling, a sheet of the stock was cured for 24 hours at 249° C. and was found to have a durometer of 46, a tensile strength of 800 p.s.i., and an elongation at break of 250 percent. After being heated at 249° C. for an additional 7 days, then at 315° C. for 48 hours, the rubber had hardened only slightly (as shown by a durometer value of 75) and the tensile strength had decreased only to 735 p.s.i. A comparable sample without the cerium salt added was brittle and useless as a rubber after the same exposure to the same temperatures.

That which is claimed is:

1. A heat curable organopolysiloxane rubber stock consisting essentially of (A) an organosiloxane of the average general formula

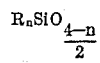

wherein R represents an organic radical selected from the group consisting of monovalent hydrocarbon radicals and halogenated monovalent hydrocarbon radicals and $n$ has a value of from 1.9 to 2.1, (B) a silica filler and (C) 0.001 to 0.40 part by weight per 100 parts of (A) of a metal selected from the group consisting of cobalt, cerium, and copper, said metal being added as the salt of carboxylic acid, and (D) an organoperoxide vulcanizing agent.

2. The organopolysiloxane rubber stock of claim 1 in which the silica filler is a fume silica.

3. A heat curable organopolysiloxane rubber stock consisting essentially of (A) a dimethylpolysiloxane, (B) a fume silica filler, (C) 0.001 to 0.40 part by weight per 100 parts of (A) of a metal selected from the group consisting of cobalt, cerium, and copper, said metal being added as the salt of a carboxylic acid, and (D) an organoperoxide vulcanizing agent.

4. A cured organosiloxane elastomer consisting essentially of (A) an organosiloxane of the average general formula

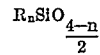

wherein R represents an organic radical selected from the group consisting of monovalent hydrocarbon radicals and halogenated monovalent hydrocarbon radicals and $n$ has a value of 1.9 to 2.1, (B) a silica filler and (C) 0.001 to 0.40 part by weight per 100 parts of (A) of a metal selected from the group consisting of cobalt, cerium, and copper, said metal having been added as the salt of a carboxylic acid.

5. The organosiloxane elastomer of claim 4 in which the silica filler is a fume silica.

6. A cured organosiloxane elastomer consisting essentially of (A) a dimethylsiloxane, (B) a fume silica filler, (C) 0.001 to 0.40 part by weight per 100 parts of (A) of a metal selected from the group consisting of cobalt, cerium, and copper added as the salt of a carboxylic acid.

7. A heat curable organopolysiloxane rubber stock consisting essentially of (A) a dimethylpolysiloxane, (B) a fume silica filler, (C) 0.001 to 0.40 part by weight based on 100 parts of (A) of copper added as copper octoate, and (D) an organoperoxide vulcanizing agent.

8. A heat curable organopolysiloxane rubber stock consisting essentially of (A) a dimethylpolysiloxane, (B) a fume silica filler, (C) 0.001 to 0.40 part by weight based on 100 parts of (A) of cobalt added as cobalt octoate, and (D) an organoperoxide vulcanizing agent.

9. An organosiloxane elastomer consisting essentially of (A) a dimethylpolysiloxane, (B) a fume silica filler, and (C) 0.001 to 0.40 part by weight based on 100 parts of (A) of cobalt added as cobalt octoate.

10. An organosiloxane elastomer consisting essentially of (A) a dimethylpolysiloxane, (B) a fume silica filler, and (C) 0.001 to 0.40 part by weight based on 100 parts of (A) of copper added as copper octoate.

11. A heat curable organopolysiloxane rubber stock consisting essentially of (A) an organopolysiloxane of average general formula $$R_nSiO_{\frac{4-n}{2}}$$

wherein R represents an organic radical selected from the group consisting of monovalent hydrocarbon radicals and halogenated monovalent hydrocarbon radicals and $n$ has a value of from 1.9 to 2.1, (B) a silica filler, (C) 0.001 to 0.40 part by weight based on 100 parts of (A) of cobalt added as the salt of a carboxylic acid, (D) an organoperoxide vulcanizing agent.

References Cited in the file of this patent

UNITED STATES PATENTS 2,759,904     Talcott _____ Aug. 21, 1956